United States Patent [19]

Morrisroe

[11] Patent Number: 4,534,675
[45] Date of Patent: Aug. 13, 1985

[54] ARTIFICIAL SEAWEED

[76] Inventor: John P. Morrisroe, 283 Park Dr., Palatine, Ill. 60067

[21] Appl. No.: 535,792

[22] Filed: Sep. 26, 1983

[51] Int. Cl.³ .............................................. E02B 3/04
[52] U.S. Cl. ......................................... 405/24; 405/63
[58] Field of Search .................. 405/15, 21, 24, 25, 405/28, 32, 63, 70

[56] References Cited

U.S. PATENT DOCUMENTS

| | | | |
|---|---|---|---|
| 3,299,640 | 1/1967 | Nielsen | 405/24 |
| 3,540,415 | 11/1970 | Bromley | 405/24 |
| 3,559,407 | 2/1971 | Schuur | 405/24 |
| 3,590,585 | 6/1971 | DeWinter | 405/24 |
| 3,640,073 | 2/1972 | Samsel | 405/70 |
| 3,726,096 | 4/1973 | Baehre | 405/24 |
| 3,793,845 | 2/1974 | Keith | 405/172 |
| 4,201,495 | 5/1980 | Preus | 405/63 |
| 4,221,500 | 9/1980 | Garrett | 405/24 |
| 4,337,007 | 6/1982 | Smith | 405/24 |

Primary Examiner—David H. Corbin

[57] ABSTRACT

Artificial "seaweed" or anti-erosion interceptor devices have a plurality of buoyant sheets or fingers roped together in spaced end-to-end relation on a lake bed bottom in patterns or contours which will best intercept sediment in the water to build up the lake bed bottom. The fingers or sheets have rope receiving sleeves at their bottom ends and float receiving sleeves or pockets at their top ends. The bottom ends are also preferably weighted down on the lake bed bottom by sediment filled tubes under the rope receiving sleeves. The buoyant fingers or sheets may be slit at their top ends to provide a plurality of narrow ribbons each having a float at its top end. In place of the individual floats for each ribbon, the sheets may have sleeves receiving a floating rope and this rope in some instances can carry depending sheets with free bottom ends.

12 Claims, 6 Drawing Figures

ARTIFICIAL SEAWEED

BACKGROUND OF THE INVENTION

1. Field of the Invention

This invention relates to improvements in artificial seaweed or interceptor devices for trapping suspended sediment in lakes and the like to build up lake beds and specifically is directed to roped together buoyant sheets in spaced end-to-end relation arranged in fence patterns best suited for individual installations to deposit sediment and build up eroded shorelines and the like.

2. Description of the Prior Art

Artificial or synthetic "seaweed" for trapping suspended particulate matter in lakes, rivers, and the like to build up deposit and stop erosion of the lake bed is known in the art. However, these prior known artificial seaweed interceptors were difficult to install and could not be conveniently laid out on the lake bed bottom in patterns which would best suit conditions for effective trapping action. These prior arrangements had individual units or assemblies that would wash out during storms and could not take advantage of lake bed bottom contours, currents, and wave action to expedite and enhance accretion of beaches and the like eroded shorelines.

It would therefore be an improvement in this art to provide artificial seaweed in the form of a plurality of individual spaced fingers or sheets roped together on the lake bed bottom to rise upwardly in the water in selected fence row patterns and cooperating with each other to prevent shifting under during storms. It would especially be an improvement in this art to be able to deploy individual seaweed units on a lake bed bottom, arrange the units in selected contours and rope them all together on the lake bed bottom so that they will all cooperate to maintain their positions.

SUMMARY OF THE INVENTION

According to this invention, a plurality of sheets or fingers of plastics material are formed with rope receiving sleeves adjacent their bottom ends. The upper ends of the sheets have float receiving pockets. In one embodiment, the sheets are about five feet wide, have a tubular bottom along the width thereof, receive lake bed sediment in this tubular bottom to anchor the sheet, have slits extending downwardly from their free top ends and have pockets filled with buoyant material at these top ends. A sleeve is provided above the tubular bottom to receive the connecting rope. In another embodiment, the tubular bottoms of the sheets may receive an anchor rope therethrough and top pockets may receive a float rope therethrough with some of the sheets having free bottom ends.

The seaweed of this invention is in the nature of a fence having roped together individual fingers or sheet units adapted to be deployed on a lake bed bottom in patterns or contours best suited for trapping sediment and building up deposits on the bottom.

The individual sheets or fingers are easily and inexpensively formed from many commercially available low density plastic films such as polyesters. Polyethylene is a preferred material and is available from a number of suppliers such as du Pont, Wilmington, Del., under the tradename "Tyvek" and "Typar", and from ADE Corporation, Chicago, Ill., under the trademark "Muscel" and "Nescel". The sheets are about 10 mm thick, have a low stretch factor, a good resistance to marine environment and a high flexibility over a wide temperature range with a specific gravity less than 1. The lengths of the sheets will depend on the depth of the water in which they are deployed with lengths of from 2 to 15 feet being conveniently handled. The widths of the sheets may also vary to meet lake bed conditions with widths of about 1½ to 5 feet being conveniently handled.

The pockets, sleeves, and anchor tubes are easily provided on the individual sheets by merely lapping their top and bottom edges and then stitching or heat sealing seams to isolate the compartments. When wide sheets are used, they are conveniently slit from their top ends to form narrow individual ribbons preferably about one foot wide with the slits coming down about 2½ feet. These ribbon tops can oscillate individually under wave action in the water, but their base ends are fixed in the water.

In another arrangement, the sheets can have rope receiving sleeves at both ends with the bottom ends receiving an anchor rope and the top ends receiving a float rope. Such sheets can alternate with sheets suspended from the top rope and having free bottom ends to act in the nature of a trap door.

The connecting rope can be anchored in any desired pattern on the lake bed bottom to form a fence of the sheets in any desired contour. The rope receiving sleeves of the sheet have a smaller diameter than the anchor tubes being in the nature of about 2 inches with the anchor tubes having a diameter of about 6 to 10 inches. The top pockets preferably have diameters of from 1 to 4 inches depending upon the buoyancy desired. The pockets are filled with pellets, rods, hollow balls, blocks, foam or cellular plastics or the like buoyant material.

The heights or lengths of the buoyant sheets or fingers are controlled so that their top ends will be below the surface of the water in which they are deployed so as not to interfere with propellors of boats and the like, and to always be below the freeze depth of the lake.

It is then an object of this invention to provide a seaweed fence having a plurality of spaced buoyant sheets anchored to a lake bed bottom and rising therefrom along a preselected path with all of the sheets cooperating to maintain the path.

A further object of this invention is to provide artificial seaweed composed of a plurality of plastic material sheets anchored to a lake bed bottom and roped together in spaced end-to-end relation to prevent shifting from a predetermined path on the lake bed.

A specific object of the invention is to provide artificial seaweed having upstanding buoyant sheets with tubular bottoms for receiving lake bed material to anchor the sheets to a lake bed bottom, sleeves for receiving a rope therethrough, and top pockets to receive buoyant material.

A still further object of this invention is to provide improved artificial seaweed having a plurality of longitudinally spaced fingers, a seabed anchor on the bottom of said fingers, a float anchor on the top of said fingers, and some of said fingers having free bottom ends.

Other and further objects of this invention will become apparent to those skilled in this art from the following detailed description of the annexed sheets of drawings which show best mode embodiments of the invention.

ON THE DRAWINGS

DETAILED DESCRIPTION OF THE PREFERRED EMBODIMENTS

Figure 1:
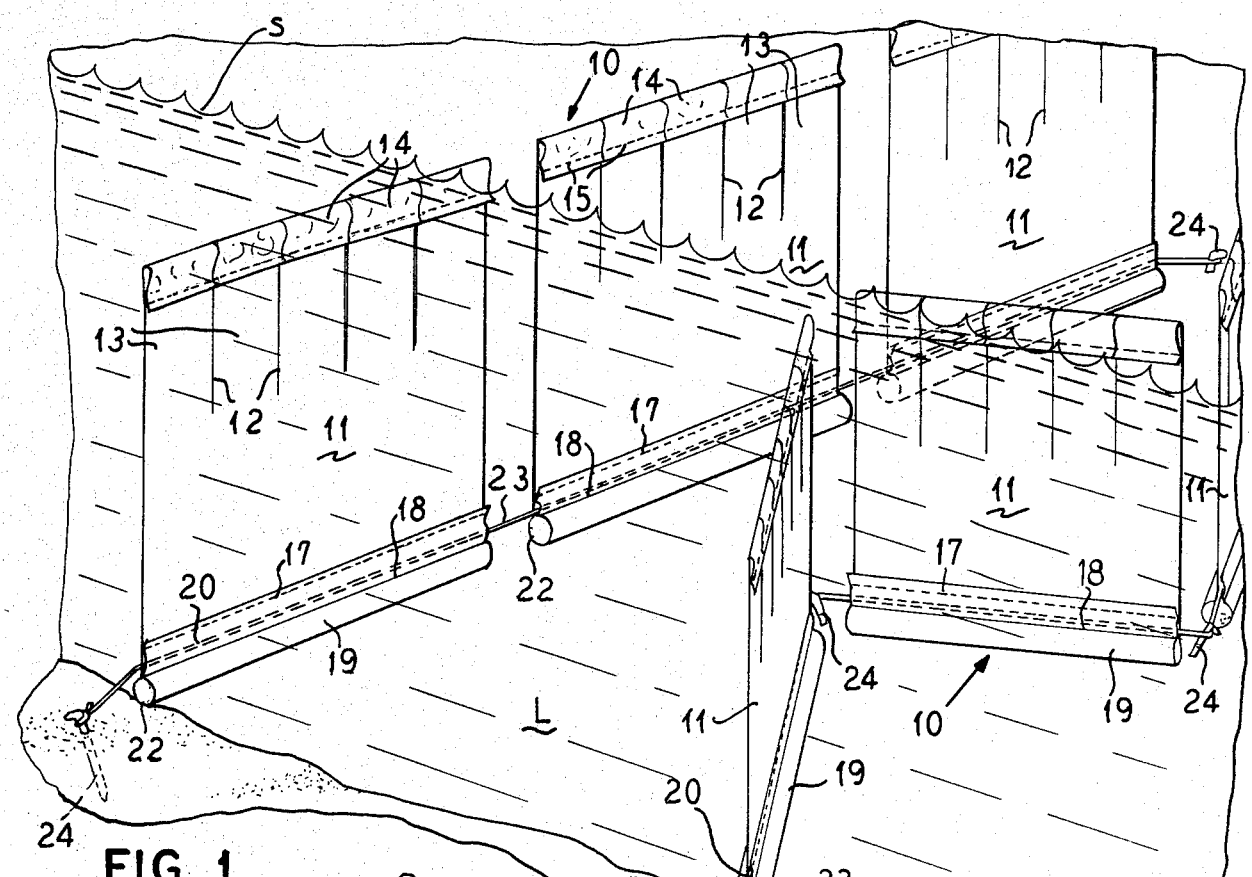
FIG. 1 is a pictoral perspective view of artificial seaweed on this invention deployed in position on a lake bottom.

In FIG. 1, the reference numerals 10 illustrate seaweed fences of this invention submerged in a lake L having a bottom B of sediment or other particulate material with the lake surface S at a level above the tops of the fences 10.

Figure 3:
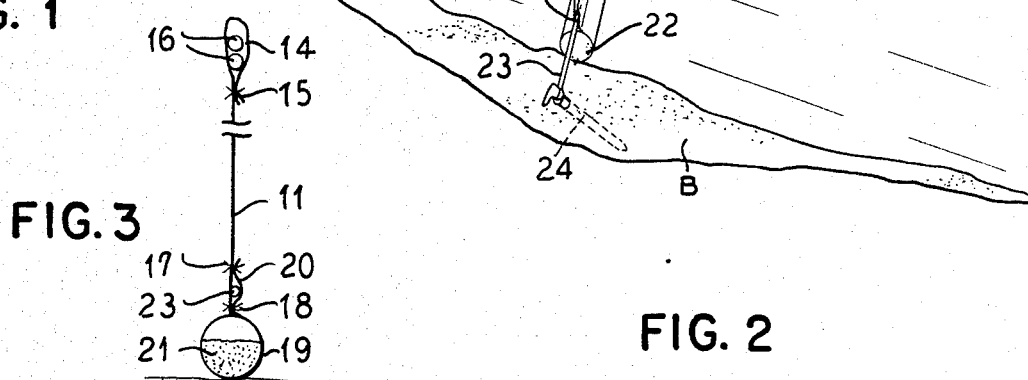
FIG. 3 is a cross-sectional view along the line III—III of FIG. 2.
Figure 2:
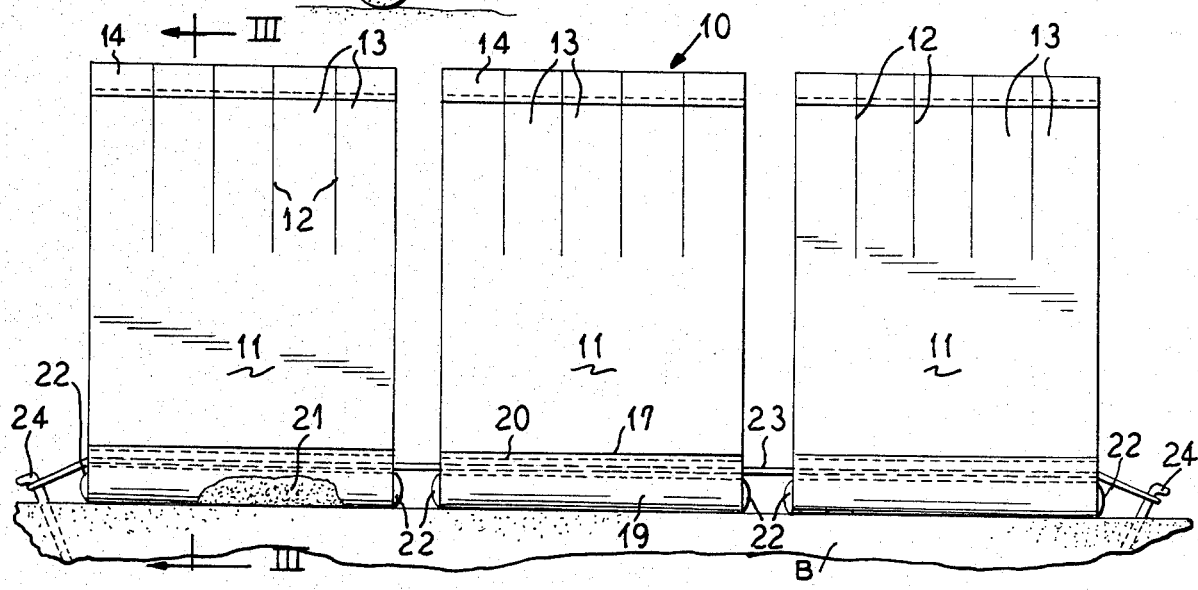
FIG. 2 is a longitudinal elevational view of a seaweed fence bottomed on a lake bed and tied together with a lake bed anchored rope.

Each fence 10 is composed of a plurality of rectangular flexible plastics material sheets 11 about 5 feet wide and about 5–7 feet long to rise from the lake bed bottom B and terminate about 2 or 3 feet below the surface S of the lake L. Each sheet 11 is slit at 12 downwardly from its top edge to about ½ the height or length of the sheet providing adjoining ribbons or fingers 13 about 1 foot wide. Each finger has a pocket 14 extending along its top edge. As illustrated in FIG. 3, the pocket 14 is formed by rolling over or lapping the top edge of the sheet and sealing the free edge to a face of the sheet by stitching, heat sealing or the like, as illustrated at 15. The pocket is filled with one or more buoyant floats 16 and the end edges of the pocket can be sealed if desired, or the float can have a tight frictional fit in the pocket, leaving the ends unsealed.

The bottom end edge of each sheet 11 is also lapped or looped over one face of the sheet with its edge sealed or stitched to the sheet as illustrated at 17 and again stitched or sealed to the face in spaced relation from the seal 17 as illustrated at 18 to form a large diameter bottom tube or sleeve 19 and a smaller diameter overlying sleeve 20. The bottom tube is filled with lake bed silt or sand 21 and the ends of the tube can close or be provided with sieves 22 accommodating flow of water therethrough but trapping the silt therein. These sieves can be in the form of open mesh plastic screens or perforations in the plastic material. If desired, the tube 19 could be perforated along the length thereof.

The sheets 11 are deployed in the lake L in spaced end-to-end relation, are filled with lake bed material so that the tubes 19 will rest on the lake bed bottom B. A rope 23 is then threaded through the sleeves 20 and has its ends anchored in the lake bed by means of weights, or stakes 24 driven into the lake bed. The rope is preferably composed of nylon or other marine resisting flexible strand material.

As illustrated in FIG. 1, one fence of seaweed 10 extends in a straight line having the sheets 11 aligned with each other in spaced end-to-end relation. The spacing between the sheets will vary as desired to suit conditions that are preferably sufficient to prevent overlapping of adjacent sheets in rough water conditions. The other fence 10 has its sheets 11 deployed in V-shaped patterns with rope anchors 24 not only at the ends of the rope 23 but also between the adjacent sheets.

Figure 4:
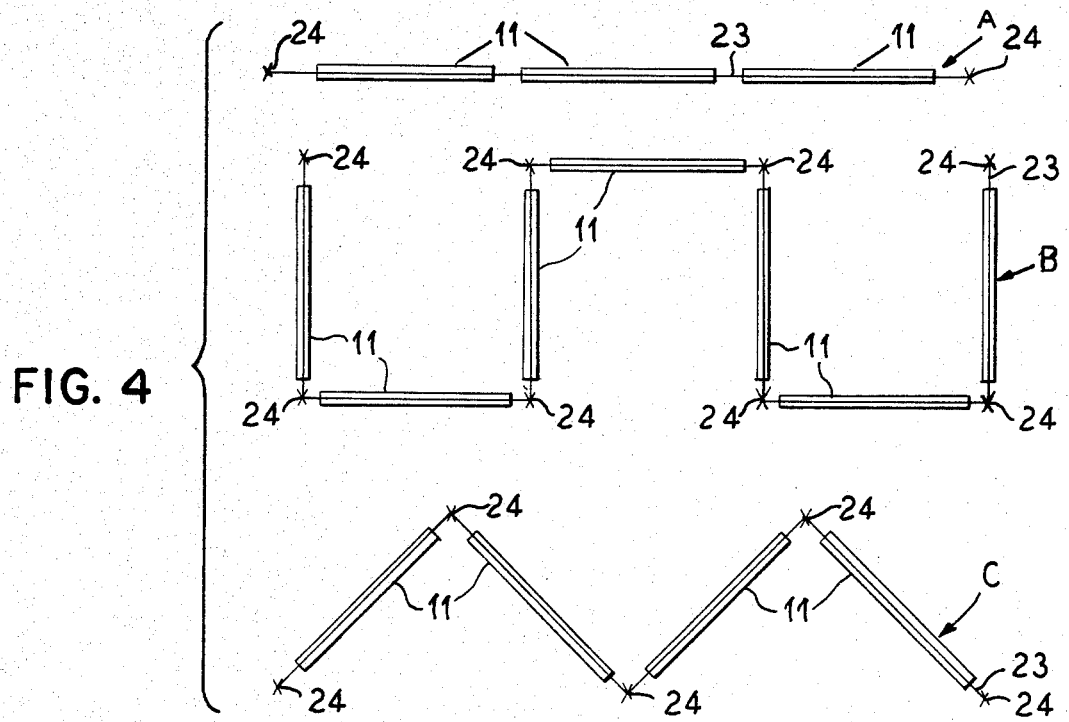
FIG. 4 shows diagrammatic plan views of seaweed fence contours according to this invention.

As illustrated in FIG. 4, a number of fence row patterns are available to suit conditions. For example, at A, the sheets 11 are deployed in a straight line in spaced end-to-end relation, at B they are deployed in a convoluted arrangement with adjoining sheets at right angles to each other and at C they are deployed in a V-shape arrangement with adjoining sheets in a desired angular relation. To maintain the sheets in convoluted positions B and C, additional rope stakes 24 are provided at the corners between adjacent sheets.

The sheets 11 may therefore be deployed on the lake bottom B in any desired pattern arrangement and a rope 23 may then be threaded through the sleeves 20 of the sheets to keep them in the selected fence row line in which they are deployed. It will thus be understood that the anchored rope 23 assists the weighted tubes 19 in securing the sheets 11 to the lake bottom and further flexibly unites all of the sheets to hold them in their selected fence row.

Figure 5:
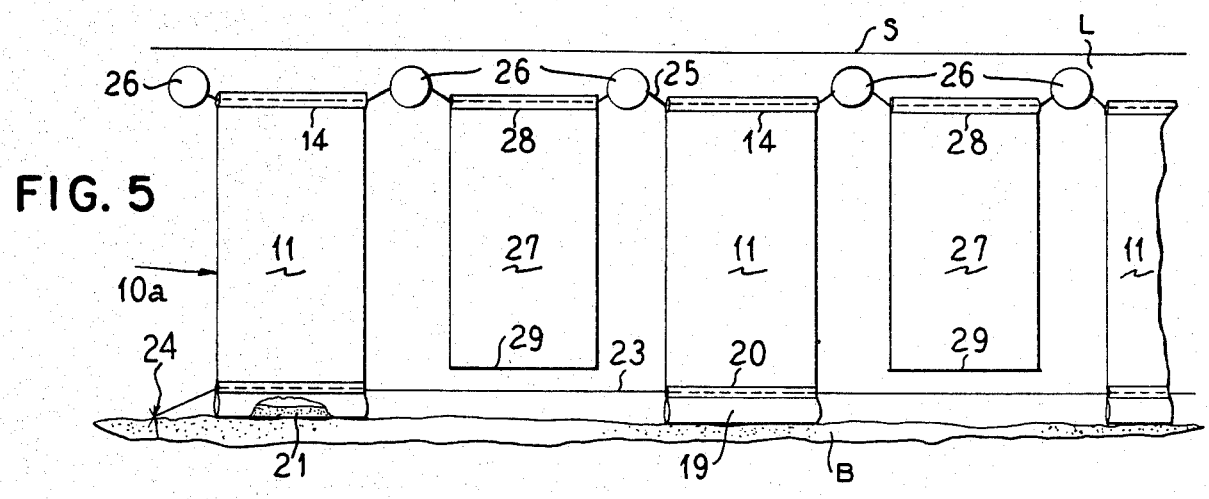
FIG. 5 is a longitudinal elevational view of a modified seaweed fence according to this invention.

As illustrated in FIG. 5, where parts corresponding with parts described in FIGS. 1–4 have been marked with the same reference numerals, the sheets 11 are narrower than illustrated in FIGS. 1–4 and each has a single sleeve 14 across its top edge receiving a flexible rope 25 therethrough with floats 26 at spaced intervals along the length of the rope causing it to float in the lake L and be held below the surface S. These narrower sheets 11 are not slit.

The sheets 11 as illustrated in FIG. 5 alternate with sheets 27 having sleeves 28 at their top ends receiving the rope 25 and having free bottom edges 29 terminating above the rope 23. This fence arrangement provides sheets 11 tied by ropes 23 and 25 at both ends alternating with "trap door" sheets 27 tied only at the top ends of the float rope 25 so that they can sway independently of the sheets 11.

An artifical seaweed fence 10a is thus provided.

Figure 6:
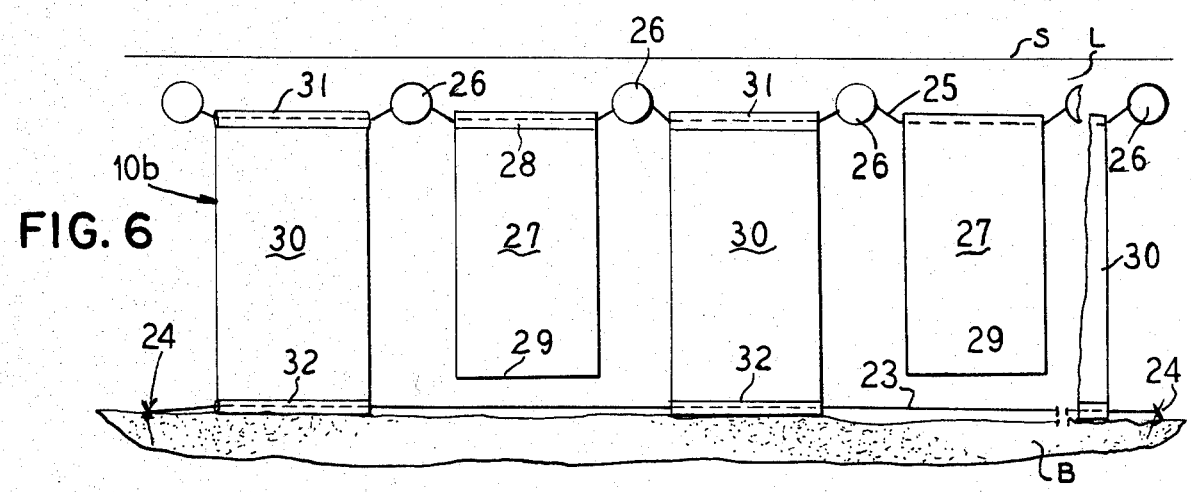
FIG. 6 is a view similar to FIG. 5 showing a further modification.

In FIG. 6, a still further modified fence 10b is provided with components corresponding to those above described being marked with the same reference numerals. In the fence 10b the trap door sheets 27 of FIG. 5 are deployed between sheets 30 each having a sleeve 31 across its upper end receiving the float rope 25 therethrough and a sleeve 32 across its bottom end receiving the anchor rope 23 therethrough. The anchor tubes 19 of the sheets 11 are eliminated. The fence 10b operates in the same manner as the above described fence 10a but relies upon the anchor rope 23 to maintain the sheets in position on the lake bed bottom. This arrangement is suitable in calmer water where the added weighted tube anchors 19 on the sheets are not needed.

The trap door sheets 27 of the FIGS. 5 and 6 embodiment can be formed of denser plastics materials than the adjoining sheets 11 or 30 so as to sink in the water from the float rope level. Alternately, of course, all of the sheets could be of the same material since the float ropes will hold.

From the above descriptions, it will be clear to those skilled in this art that this invention provides improvements in artificial seaweed where it is now possible to deploy individual sediment trapping units in selected fence row configurations where flexible ropes tie the individual units together causing them to cooperate for inhibiting shifting on a lake bed bottom during storm periods. Thus, if some of the sheets are being pounded by waves tending to shift them, the adjacent sheets will hold them in line. The individual units are easily deployed on lake bed bottoms in their most effective positions and are then tied together to maintain these positions.

I claim as my invention:

1. Artificial seaweed for use in inhibiting lake erosion and the like which comprises a plurality of one-piece flexible water resisting sheets in spaced end to end relation, each sheet having lapped over top and bottom portions secured to the sheet forming longitudinal top and bottom sleeves, float means in the top sleeves, and an anchor rope threaded through the bottom sleeves tying the sheets together on a lake bed bottom in fence rows maintained by the rope.

2. Artificial seaweed for deployment on lake bed bottoms and the like to build deposits thereon from particulate matter suspended in the water which comprises a plurality of plastics material sheets having bottom tubes across the widths thereof, sleeves across the width thereof adjacent and above the bottom tubes, and pockets along the top ends thereof, floats in said top pockets, lake bed sediment in said bottom tubes for anchoring the sheets on a lake bed bottom, and an anchor rope threaded through the sleeves holding the sheets in a selected fence row alignment on the lake bed bottom.

3. In a body of water having a bottom bed of particulate material, artificial seaweed deployed in said body which comprises a plurality of sheets of flexible water resisting buoyant plastics material, said sheets having folded over bottom ends, spaced parallel seals uniting the folded over ends to the sheet forming superimposed adjacent sleeves along the widths of the sheets, slits extending from the top edges of the sheets providing individual fingers across the widths of the sheets, pockets on the upper ends of the fingers, floats in said pockets, lake bed sediment filling the bottom sleeves holding the sheets on the lake bed bottom, a flexible rope threaded through the sleeves superimposed adjacent the sediment filled bottom sleeves of the sheets, and anchors on the rope whereby the sheets are maintained in a fixed fence row position on the lake bed bottom.

4. The seaweed of claim 1 including a tube across the width of a sheet below the bottom sleeve receiving lake bed bottom sediment to hold the sheet on the lake bed bottom.

5. The seaweed of claim 4 wherein the tube has a sieve retaining the sediment while allowing water to escape from the tube.

6. The seaweed of claim 1 wherein the float means is a float rope threaded through the top sleeves.

7. The seaweed of claim 6 including sheets suspended from the float rope having free bottom ends.

8. The artificial seaweed of claim 1 wherein the rope is anchored to the lake bed bottom between the spaced sheets.

9. The seaweed of claim 2 wherein each sheet is lapped at its top and bottom edges forming the tube, sleeve and pocket.

10. The seaweed of claim 2 wherein the fence row is convoluted and stakes driven in the lake bed bottom hold the sheets in fixed positions in said row.

11. The seaweed of claim 2 including a float rope threaded through the pockets and additional trap door sheets suspend from the float rope are disposed between the first mentioned sheets.

12. The seaweed of claim 3 wherein the slits extend only about half the length of the sheets.

* * * * *